(12) United States Patent
Chono et al.

(10) Patent No.: US 11,539,872 B2
(45) Date of Patent: Dec. 27, 2022

(54) IMAGING CONTROL SYSTEM, IMAGING CONTROL METHOD, CONTROL DEVICE, CONTROL METHOD, AND STORAGE MEDIUM

(71) Applicant: NEC Corporation, Tokyo (JP)

(72) Inventors: Keiichi Chono, Tokyo (JP); Masato Tsukada, Tokyo (JP); Chisato Funayama, Tokyo (JP); Ryuichi Akashi, Tokyo (JP); Yuka Ogino, Tokyo (JP); Takashi Shibata, Tokyo (JP); Shoji Yachida, Tokyo (JP); Hiroshi Imai, Tokyo (JP); Emi Kitagawa, Tokyo (JP); Yasuhiko Yoshida, Tokyo (JP); Yusuke Mori, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/279,141

(22) PCT Filed: Sep. 28, 2018

(86) PCT No.: PCT/JP2018/036347
§ 371 (c)(1),
(2) Date: Mar. 24, 2021

(87) PCT Pub. No.: WO2020/065931
PCT Pub. Date: Apr. 2, 2020

(65) Prior Publication Data
US 2021/0400202 A1 Dec. 23, 2021

(51) Int. Cl.
*H04N 5/232* (2006.01)
*G03B 13/36* (2021.01)
(52) U.S. Cl.
CPC ....... *H04N 5/232121* (2018.08); *G03B 13/36* (2013.01); *H04N 5/23245* (2013.01)

(58) Field of Classification Search
CPC .......... H04N 5/23212; H04N 5/23206; H04N 5/23245; H04N 5/232121; H04N 5/23219;
(Continued)

(56) References Cited

U.S. PATENT DOCUMENTS 5,629,735 A  5/1997 Kaneda et al.
5,649,240 A  7/1997 Saegusa
(Continued)

FOREIGN PATENT DOCUMENTS

CN  206871378 U  1/2018
JP  H03-077481 A  4/1991
(Continued)

OTHER PUBLICATIONS

Extended European Search Report for EP Application No. 18934766.9 dated Aug. 27, 2021.
(Continued)

*Primary Examiner* — Pritham D Prabhakher
(74) *Attorney, Agent, or Firm* — Sughrue Mion, PLLC

(57) ABSTRACT

To provide a system, a method and the like for acquiring more images or more quickly focused images. A control device acquires information regarding a situation of a range captured by an imaging device, determines a mode according to an assumed situation of the range captured by the imaging device among a plurality of focusing modes, and transmits designation information specifying the determined mode to the imaging device. The imaging device receives the designation information from the control device, and captures an image using the mode specified by the received designation information.

16 Claims, 12 Drawing Sheets

| SITUATION OF IMAGED REGION | | AF MODE |
|---|---|---|
| TIME OF DAY | PLACE | |
| AM8:00–PM10:00 | BUILDING ENTRANCE | CONTINUOUS AF MODE |
| | PARKING | ONE-SHOT AF MODE |
| | IN BUILDING | ONE-SHOT AF MODE |
| PM10:00–AM6:00 | BUILDING ENTRANCE | ONE-SHOT AF MODE |
| | PARKING | FIXED FOCUS MODE |
| | IN BUILDING | STOP IMAGING |
| AM6:00–AM8:00 | BUILDING ENTRANCE | ONE-SHOT AF MODE |
| | PARKING | CONTINUOUS AF MODE |
| | IN BUILDING | CONTINUOUS AF MODE |

(58) Field of Classification Search
CPC ........ G03B 15/006; G03B 13/36; G03B 3/10; G02B 7/28
USPC .......................................................... 348/348
See application file for complete search history.

(56) References Cited

U.S. PATENT DOCUMENTS

| | | | | |
|---|---|---|---|---|
| 9,077,888 | B2* | 7/2015 | Luong | H04N 5/232945 |
| 9,473,689 | B2* | 10/2016 | Xiu | H04N 5/2353 |
| 10,459,190 | B2* | 10/2019 | Suzuki | G06V 10/255 |
| 10,721,384 | B2* | 7/2020 | Schwager | H04N 13/282 |
| 2006/0214001 | A1* | 9/2006 | Chuang | H04W 48/18 235/472.01 |
| 2007/0023497 | A1* | 2/2007 | Chuang | H04H 60/51 235/375 |
| 2007/0228159 | A1 | 10/2007 | Kashiwa et al. | |
| 2009/0122158 | A1* | 5/2009 | Chen | G03B 13/36 348/E5.042 |
| 2010/0098397 | A1* | 4/2010 | Yata | H04N 5/232123 396/124 |
| 2013/0169853 | A1* | 7/2013 | Luong | H04N 5/232127 348/E5.045 |
| 2014/0333824 | A1 | 11/2014 | Xiu | |
| 2017/0085771 | A1* | 3/2017 | Schwager | H04N 5/2352 |
| 2017/0109572 | A1 | 4/2017 | Tojo et al. | |
| 2017/0251386 | A1 | 8/2017 | Perna et al. | |
| 2018/0348470 | A1* | 12/2018 | Suzuki | H04N 5/232127 |

FOREIGN PATENT DOCUMENTS

| | | |
|---|---|---|
| JP | H08-338942 A | 12/1996 |
| JP | 2006-074475 A | 3/2006 |
| JP | 2007-219713 A | 8/2007 |
| JP | 2009-290537 A | 12/2009 |
| JP | 2012-113204 A | 6/2012 |
| JP | 2013-142729 A | 7/2013 |
| JP | 2013-205595 A | 10/2013 |
| JP | 2016-048824 A | 4/2016 |
| JP | 2017-076288 A | 4/2017 |
| JP | 2017-098720 A | 6/2017 |
| JP | 2017-530476 A | 10/2017 |

OTHER PUBLICATIONS

Japanese Office Action for JP Application No. 2020-547805 dated May 10, 2022 with English Translation.
International Search Report for PCT Application No. PCT/JP2018/036347, dated Dec. 25, 2018.
English translation of Written opinion for PCT Application No. PCT/JP2018/036347, dated Dec. 25, 2018.
Japanese Office Action for JP Application No. 2020-547805 dated Nov. 1, 2022 with English Translation.

* cited by examiner

| SITUATION IN IMAGING RANGE (PLACE) | AF MODE |
|---|---|
| SPECTATOR SEAT | ONE-SHOT AF MODE |
| ENTRANCE | CONTINUOUS AF MODE |
| ⋮ | ⋮ |

Fig.12

| SITUATION OF IMAGING REGION (TIME OF DAY) | AF MODE | (ASSUMED SITUATION) |
|---|---|---|
| 6:00 AM TO 8:30 AM | ONE-SHOT AF MODE | IT IS BEFORE OPENING AND FLOOR STUFFS ARE AUTHENTICATED |
| 8:30 AM TO 9:30 AM | CONTINUOUS AF MODE | JUST OPENED, SO THAT THERE ARE MANY VISITORS TO BE AUTHENTICATED |
| 9:30 AM TO 5:00 PM | ONE-SHOT AF MODE | THERE ARE NOT MANY PEOPLE AND PERSON TO BE AUTHENTICATED STOPS AT PREDETERMINED POSITION |
| 5:00 PM TO 8:00 PM | FIXED FOCUS MODE | VISITORS LEAVE AND ONLY PREDETERMINED PERSON IS AUTHENTICATED |
| . . . | | . . . |

Fig.13

| SITUATION OF IMAGED REGION | | AF MODE |
|---|---|---|
| TIME OF DAY | PLACE | |
| AM8:00–PM10:00 | BUILDING ENTRANCE | CONTINUOUS AF MODE |
| | PARKING | ONE-SHOT AF MODE |
| | IN BUILDING | ONE-SHOT AF MODE |
| PM10:00–AM6:00 | BUILDING ENTRANCE | ONE-SHOT AF MODE |
| | PARKING | FIXED FOCUS MODE |
| | IN BUILDING | STOP IMAGING |
| AM6:00–AM8:00 | BUILDING ENTRANCE | ONE-SHOT AF MODE |
| | PARKING | CONTINUOUS AF MODE |
| | IN BUILDING | CONTINUOUS AF MODE |

IMAGING CONTROL SYSTEM, IMAGING CONTROL METHOD, CONTROL DEVICE, CONTROL METHOD, AND STORAGE MEDIUM

This application is a National Stage Entry of PCT/JP2018/036347 filed on Sep. 28, 2018, the contents of all of which are incorporated herein by reference, in their entirety.

TECHNICAL FIELD

The disclosure relates to a technology of controlling an imaging device that captures an image of a target to be authenticated or detected.

BACKGROUND ART

The development of the technology regarding authentication of an object captured by an imaging device is advanced.

Especially, in a case of acquiring an image of an authentication target by the imaging device that images over a wide area such as a monitoring camera, a technology of imaging the authentication target in focus as much as possible by the imaging device is one of required technologies. Such technology is considered to be especially required in a case where a fine feature such as an iris is used for authentication.

Many imaging devices have a function of automatically adjusting the focus, that is, an autofocus (AF) function. There are several types of modes for executing AF. One is a continuous AF mode and another is a one-shot AF mode. The continuous AF mode is the mode of imaging while continuously adjusting the focus. The one-shot AF mode is the mode of adjusting the focus at a certain timing (typically, a timing when a photographer presses a shutter release button halfway), and continuously imaging with the adjusted focus after the adjustment. The one-shot AF mode is sometimes referred to as a single AF mode.

PTLs 1 and 2 disclose technologies regarding an imaging mode of an imaging device.

PTL 1 discloses the example embodiments regarding a camera capable of automatically adjusting the focus. The camera is provided with an information setting device that sets an AF mode. In this camera, as an example, an automatic switching mode for automatically switching between a continuous AF mode and a one-shot AF mode may be set. PTL 1 suggests that, in the automatic switching mode, imaging may be performed in different modes in a case where an object is discriminated to be a moving object and a case where the object is discriminated to be a stationary object.

PTL 2 discloses an iris biometric recognition module that continuously adjusts an operation of an iris illuminator and an iris imaging device at a high speed. PTL 2 discloses that a "focus sweep" technology may be applied in a case where an object is moving, and another technology may be applied in a case where the object is in a stationary state.

CITATION LIST

Patent Literature

[PTL 1] JP 08-338942 A
[PTL 2] JP 2017-530476 A

SUMMARY

Technical Problem

In order to acquire more sharp images or more quickly acquire the images, it is important to appropriately set an AF mode.

For example, a one-shot AF mode is considered to be more preferably used than a continuous AF mode under a situation in which a position of an object changes little. This is because, in the continuous AF mode, the focus may be changed when the object only moves back and forth or when something only crosses in front of the object, and as a result, a time in which it is possible to take an image in a focusing state may reduce as compared with a case where the one-shot AF mode is used (or it may take a long time to capture an image in focus).

As suggested in PTLs 1 and 2, in a case where it is configured that the AF mode is changed on the basis of the determination as to whether it is stationary, the one-shot AF mode is not necessarily used in the above-described situation. If the object is moving back and forth, the continuous AF mode may be used, and it is possible that this does not meet an object of acquiring more sharp images or more quickly acquiring the images.

An object of the example embodiments is to provide a system, method and the like for acquiring more images or more quickly focused images.

Solution to Problem

An imaging control system according to an aspect of the example embodiments includes a control device and an imaging device. The control device is provided with a determination means for determining a mode according to an assumed situation of a range captured by the imaging device among a plurality of focusing modes, and a transmission means for transmitting designation information specifying the determined mode to the imaging device. The imaging device receives the designation information from the control device, and captures an image using the mode specified by the received designation information.

An imaging control method according to an aspect of the example embodiments acquires information regarding a situation of a range captured by an imaging device, determines a mode according to an assumed situation of the range captured by the imaging device among a plurality of focusing modes, and transmits designation information specifying the determined mode to the imaging device. The imaging device receives the designation information, and captures an image using the mode specified by the received designation information.

A storage medium according to an aspect of the example embodiments records a program that causes a computer to execute acquisition processing of acquiring information regarding a situation of a range captured by an imaging device, determination processing of determining the mode used by the imaging device according to an assumed situation of the range captured by the imaging device among a plurality of focusing modes, and transmission processing of transmitting designation information specifying the determined mode to the imaging device.

Advantageous Effects

According to the example embodiments, it is possible to acquire more images or more quickly focused images.

BRIEF DESCRIPTION OF DRAWINGS

FIG. 12 is a view illustrating a second example of data used to determine a type of a focusing mode.

FIG. 13 is a view illustrating a third example of data used to determine a type of a focusing mode.

EXAMPLE EMBODIMENT

Figure 1:
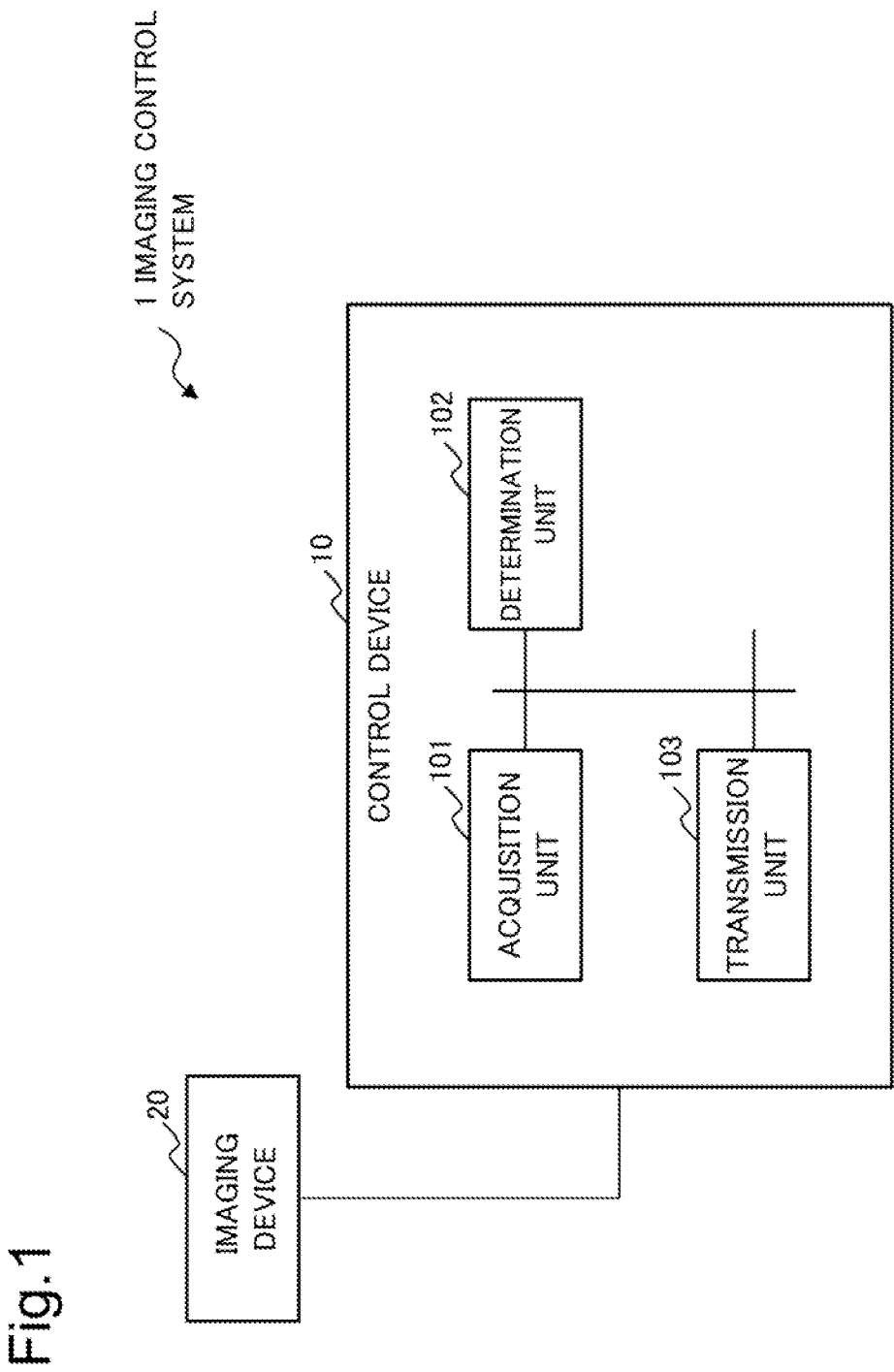
FIG. 1 is a block diagram illustrating a configuration of an imaging control system according to a first example embodiment.

Hereinafter, example embodiments are described in detail with reference to the drawings. Lines connecting components in the drawings illustrating a configuration of a system are exemplary lines for facilitating understanding of a data flow. The components do not necessarily have to be connected as indicated by the lines in the drawings.

First Example Embodiment

First, a first example embodiment is described.
<Configuration>

FIG. 1 is a block diagram illustrating a configuration of an imaging control system 1 according to a first example embodiment.

The imaging control system 1 includes a control device 10 and an imaging device 20 connected so as to be able to communicate with each other. Although only one imaging device 20 is illustrated in FIG. 1, the imaging control system 1 may include a plurality of imaging devices 20. That is, the control device 10 may be connected to a plurality of imaging devices 20. A mode of connection between the control device 10 and the imaging device 20 does not matter.

The imaging device 20 generates an image of an imaging range by imaging. The imaging range is a range defined by a position, a posture, an angle of view and the like of the imaging device 20. The imaging device 20 may use a plurality of types of focusing modes. Two modes out of the modes available to the imaging device 20 may be, for example, a first mode in which autofocus is continuously executed and a second mode in which autofocus is performed less frequently than in the first mode.

The control device 10 determines a focusing mode used by the imaging device 20. As illustrated in FIG. 1, the control device 10 is provided with an acquisition unit 101, a determination unit 102, and a transmission unit 103. Each component of the control device 10 may be implemented by, for example, a computer including one or a plurality of processors that executes an instruction based on a program and a memory.

The acquisition unit 101 acquires information regarding a situation of the range captured by the imaging device 20.

The determination unit 102 determines a mode according to an assumed situation of the range captured by the imaging device 20 among a plurality of types of focusing modes.

The transmission unit 103 transmits information specifying the mode determined by the determination unit 102 (also referred to as "designation information") to the imaging device 20.

<Operation>

Figure 2:
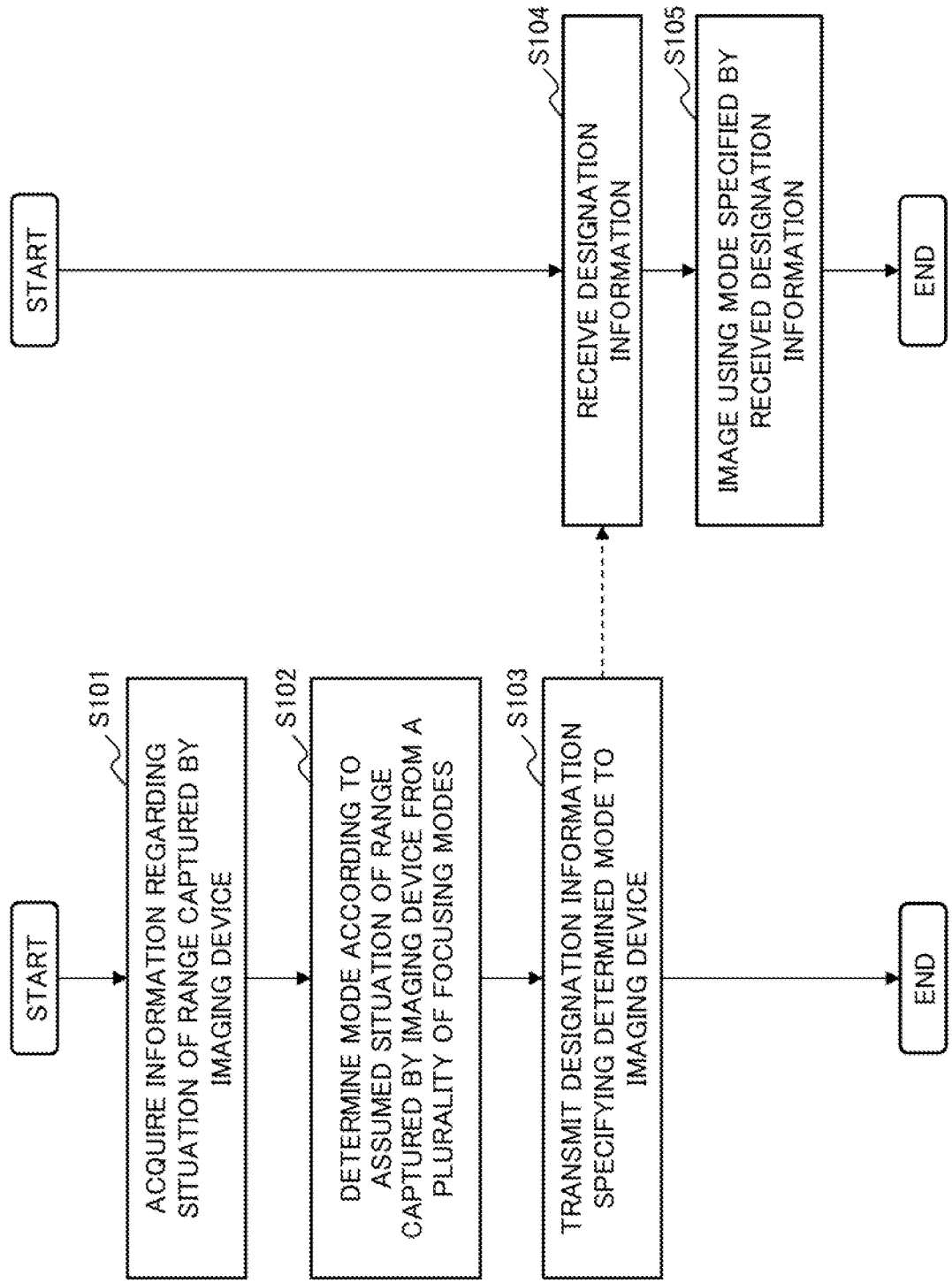
FIG. 2 is a flowchart illustrating a flow of an imaging control method according to the first example embodiment.

A processing flow by the control device 10 and the imaging device 20 is described with reference to a flowchart in FIG. 2.

First, the acquisition unit 101 of the control device 10 acquires the information regarding the situation of the range captured by the imaging device 20 (step S101). Next, the determination unit 102 determines the mode according to the assumed situation of the range captured by the imaging device 20 among a plurality of types of focusing modes (step S102). Then, the transmission unit 103 transmits the designation information specifying the mode determined by the determination unit 102 to the imaging device 20 (step S103).

The imaging device 20 receives the designation information (step S104) and captures an image using the mode specified by the received designation information (step S105).

Effect

According to the imaging control system 1 according to the first example embodiment, it is possible to acquire more images or more quickly focused images. This is because the focusing mode used by the imaging device 20 is switched according to the assumed situation of the range captured by the imaging device 20.

Figure 3:
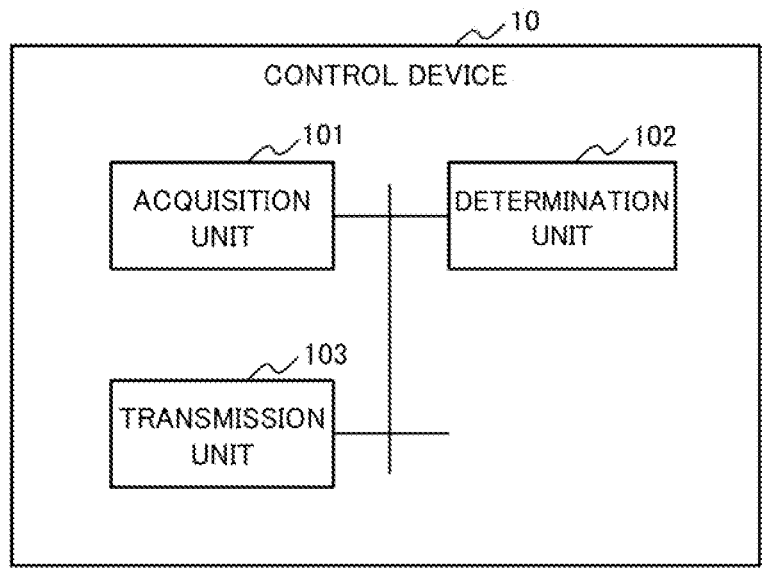
FIG. 3 is a block diagram illustrating a configuration of a control device according to the first example embodiment.
Figure 4:
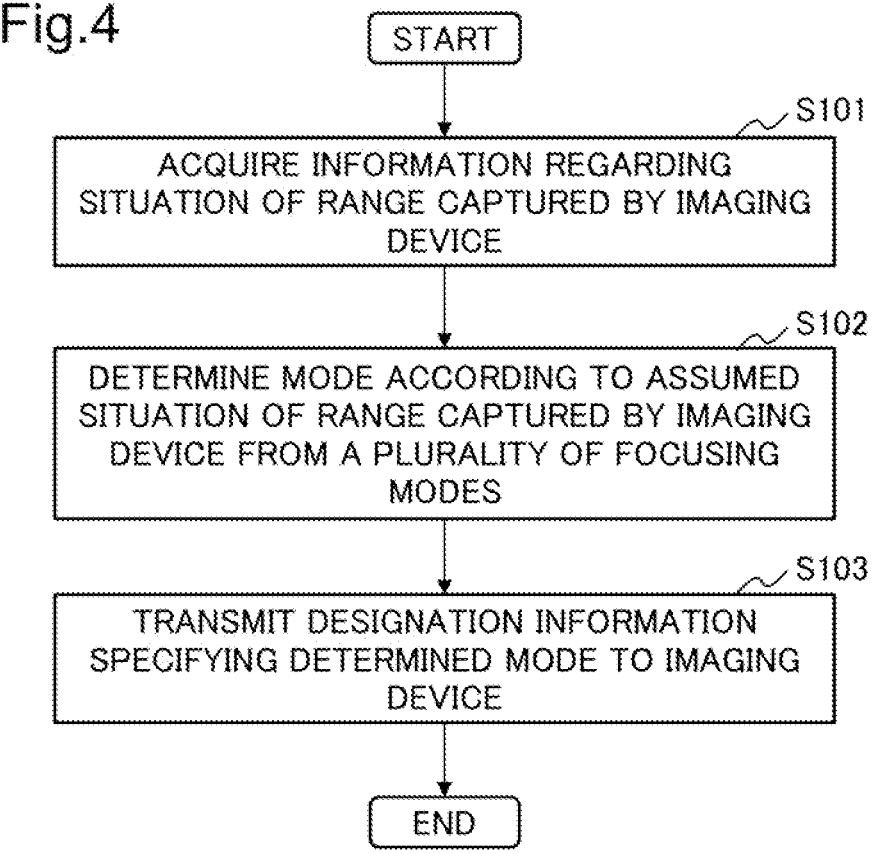
FIG. 4 is a flowchart illustrating the flow of the control method according to the first example embodiment.

FIG. 3 is a block diagram illustrating only a configuration of the control device 10 out of the configuration illustrated in FIG. 1. FIG. 4 is a flowchart illustrating only a flow of an operation performed by the control device 10 out of the flowchart illustrated in FIG. 2. According to the control device 10, it is possible to allow the imaging device to acquire more images or more quickly focused images.

Second Example Embodiment

Hereinafter, a specific example of an imaging control system 1 is described.

In the following description, "AF" refers to autofocus.

<Configuration>

Figure 5:
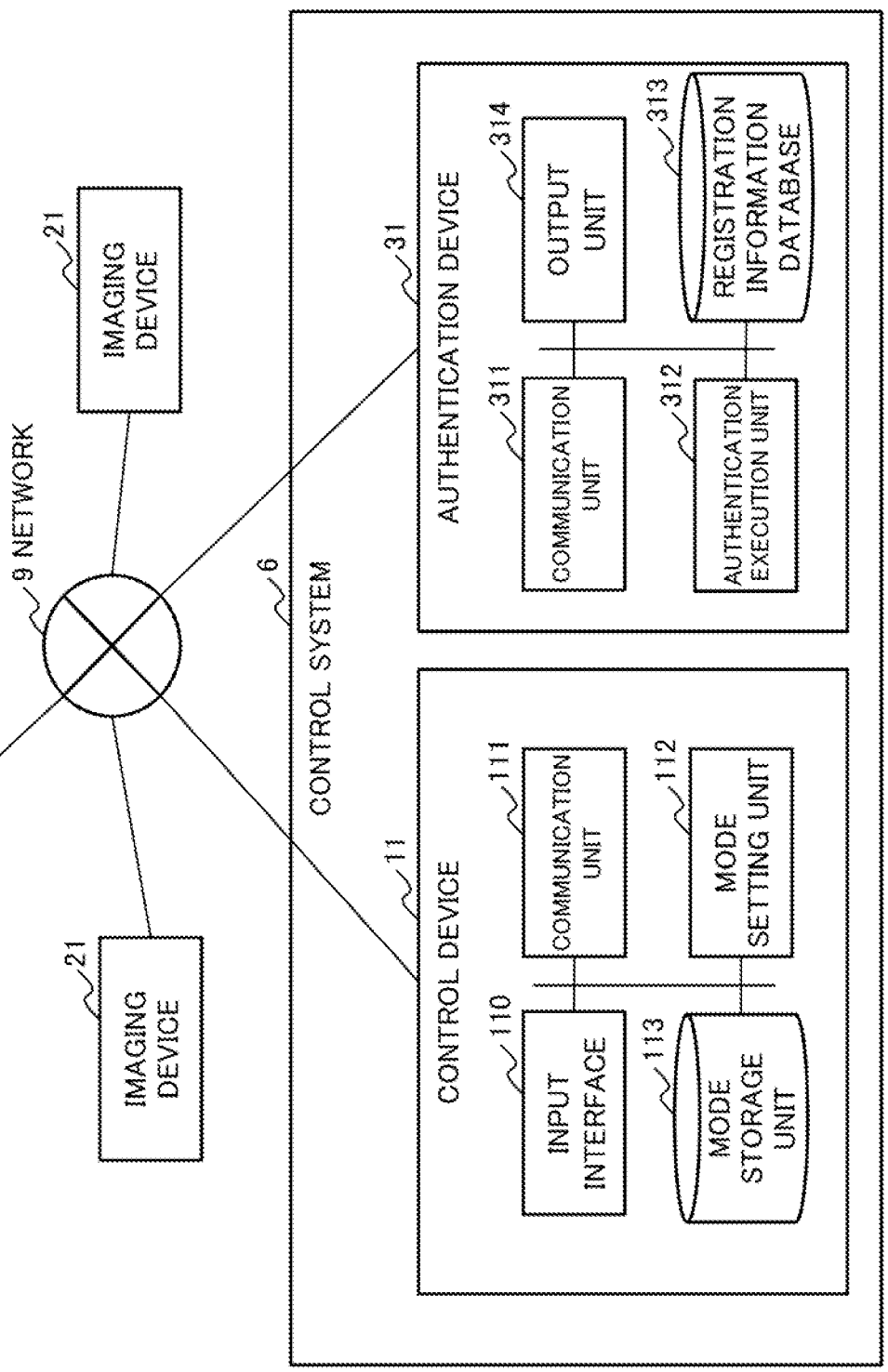
FIG. 5 is a block diagram illustrating a configuration of an imaging control system according to a second example embodiment.

FIG. 5 is a block diagram illustrating a configuration of an imaging control system 2 being one specific example of the imaging control system 1. The imaging control system 2 includes a control device 11, an authentication device 31, and a plurality of imaging devices 21 connected to the control device 11 and the authentication device 31. Although three imaging devices 21 are illustrated in FIG. 5, the number of imaging devices 21 does not matter. Although one network 9 is illustrated between the devices in FIG. 5, a mode of connection is not limited to this.

Although the control device 11 and the authentication device 31 are illustrated separately for convenience of explanation, they may be the same device. In this case, a partial functional configuration (a communication unit 111, a communication unit 311 and the like) may be formed of a single member.

In a case where the control device 11 and the authentication device 31 are separate devices, the control device 11 and the authentication device 31 may be connected so as to be able to communicate with each other, or they need not be connected to each other. In a case where the control device 11 and the authentication device 31 are connected so as to be able to communicate with each other, a communication path may be different from a communication path between the imaging device 21 and the control device 11, or may be a partially common path.

In the disclosure, a pair of the control device 11 and the authentication device 31 is also referred to as a control system 6. In one example embodiment, the control system 6 may be installed in a specific place (monitoring center, monitoring control room and the like).

===Imaging Device 21===

The imaging device 21 generates an image of an imaging range by imaging. The imaging device 21 is equipped with an imaging element such as a charge coupled device (CCD) or a complementary metal oxide semiconductor (CMOS) image sensor, for example. The imaging device 21 is not limited to a visible light camera; this may also be a near infrared camera, an infrared camera and the like. The imaging device 21 generates the image by imaging. Hereinafter, the image generated by imaging by the imaging device 21 is also referred to as a captured image. The captured image may be a color image or may be a grayscale image. The imaging device 21 may continuously generate the captured images at a predetermined frame rate. The imaging device 21 may execute imaging as this receives an imaging instruction from the control system 6. The imaging device 21 transmits the generated captured image to the control system 6 at any time or in response to a request from the control system 6.

The imaging device 21 has an autofocus (AF) function. As described already, examples of modes for executing AF include a continuous AF mode and a one-shot AF mode. The imaging device 21 of this example embodiment may use at least the two modes. The two modes are specific examples of the "focusing mode" described in the above-described first example embodiment.

In a case where the continuous AF mode is executed, the imaging device 21 continuously adjusts focus. Specifically, the imaging device 21 periodically determines whether to change the focus on a short cycle (for example, on a cycle shorter than one second), and changes the focus when determining to change the focus. A method of determining whether to change the focus and a method of changing the focus in such a way that the image becomes sharper may be a method using a known method (for example, a ranging method, a contrast detecting method, a phase difference AF method, an image plane phase difference AF method and the like). The imaging device 21 may be configured to change the focus in such a way that a feature used in authentication processing by the authentication device 31 (to be described later) become sharper.

In a case where the one-shot AF mode is executed, after setting the focus at a specific timing, the imaging device 21 captures an image without changing the set focus until a next specific timing. The specific timing is, for example, a timing at which an instruction to adjust the focus is received from the control system 6. Alternatively, the specific timing may be a timing that comes on a certain cycle. The cycle in this case is longer than the cycle of determining whether to change the focus in the continuous AF mode described above (for example, a cycle of five seconds or longer).

The imaging device 21 may switch the AF mode used by the device itself (imaging device 21) on the basis of a setting instruction from the control device 11. The setting instruction from the control device 11 includes, for example, information specifying a type of the AF mode. In a case where the type of the AF mode indicated by the setting instruction is different from the currently executed mode, the imaging device 21 changes the AF mode used by the device itself (imaging device 21) to the indicated mode.

===Authentication Device 31===

The authentication device 31 performs the authentication processing on a target captured by the imaging device 21. In this example embodiment, the target is assumed to be a person.

The authentication processing is processing of checking a feature extracted from the target against registered features being features registered in advance, and specifying personal identification information associated with the registered feature that matches the feature extracted from the target.

The feature used for authentication by the authentication device 31 is, for example, the feature that may appear in the captured image among physical features inherent to an individual (also referred to as "biometric information"). Examples of the feature used in the authentication include a face, an iris, a palm shape, a palm print, a fingerprint, an auricle or the like.

Other features used in the authentication by the authentication device 31 may be a feature of an article worn or carried by the target, an identification code (bar code, 2D code and the like) attached to the article and the like.

For example, as illustrated in FIG. 5, the authentication device 31 is provided with the communication unit 311, an authentication execution unit 312, a registration information database 313, and an output unit 314.

The communication unit 311 receives the captured image from the imaging device 21. The authentication device 31 may transmit the imaging instruction to the imaging device 21 via the communication unit 311. The communication unit 311 may be configured to receive the captured image from the imaging device 21 on a predetermined cycle.

The registration information database 313 stores the personal identification information of the person and information on the feature that may be extracted from the person in association with each other. The personal identification information may include, for example, a name, a date of birth, an attribute (gender, age, official position and the like), and a unique identifier (ID) assigned to each person.

The authentication execution unit 312 performs the authentication processing using the registration information database 313 on a person included in the captured image received from the imaging device 21. Specifically, the authentication execution unit 312 executes the following process, for example.

First, the authentication execution unit 312 detects the person from the captured image. A method of detecting the person may be a known method. The authentication execution unit 312 then extracts the feature from the detected person. In a case where the iris is adopted as the feature, the authentication execution unit 312 specifies a position of an eye from the detected person and extracts a portion of the iris included in the eye. The authentication execution unit 312 checks the extracted feature against the features registered in the registration information database 313 (that is, the registered features) and specifies the registered feature determined to match the extracted feature among the registered features. In a case where there is the registered feature determined to match the extracted feature, the authentication execution unit 312 identifies the person included in the captured image as a person identified by the personal identification information associated with the registered feature (that is, "the authentication is successful"). In a case where there is no registered feature determined to match the extracted feature, the personal identification information of the person included in the captured image is not specified, that is, "the authentication is failed".

The authentication execution unit 312 allows the output unit 314 to output a result of the authentication processing. The result of the authentication processing is, for example, information including the personal identification information of the person whose "authentication is successful" and information on time and place when and where the person is captured. Alternatively, the result of the authentication processing may also be, for example, an image obtained by superimposing information indicating whether the authentication of the person included in the captured image is "successful" or "failed" on the captured image. The personal identification information may be further superimposed on the superimposed image.

The output unit 314 outputs the result of the authentication processing. The output unit 314 is, for example, a display. It is also possible that the output unit 314 merely outputs the result of the authentication processing to a storage medium or an information processing device other than the authentication device 31.

===Control Device 11===

The control device 11 is a specific example of the control device 10.

Figure 6:
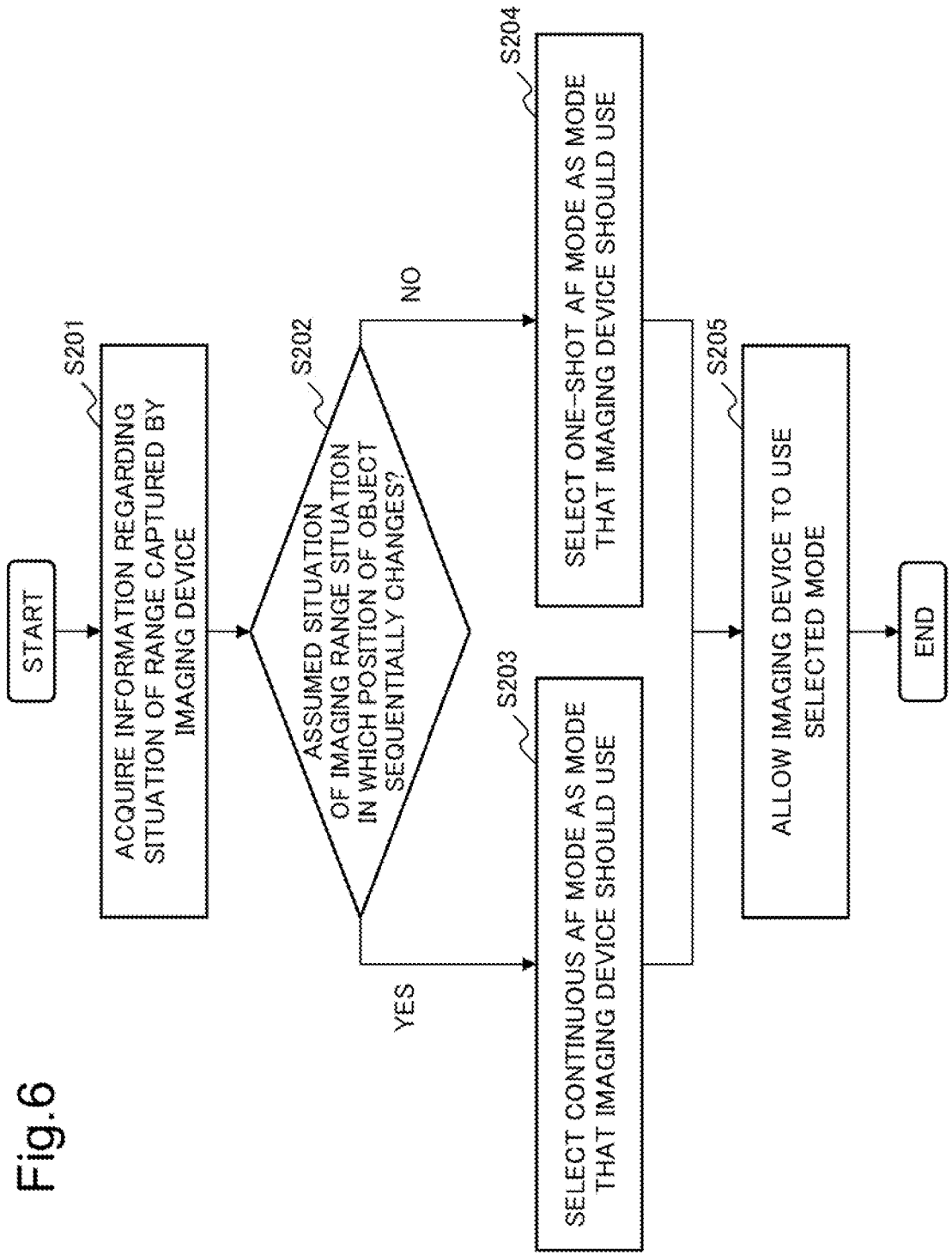
FIG. 6 is a flowchart for explaining a technical concept according to the second example embodiment.

Before describing components of the control device 11, a technical concept regarding the control device 11 is described. FIG. 6 is a flowchart illustrating the technical concept regarding the control device 11. The control device 11 according to the second example embodiment is designed to conform to this technical concept.

First, the control device 11 acquires information regarding a situation of a range captured by the imaging device 21 (step S201). After that, the control device 11 performs different processes depending on whether an assumed situation of the imaging range is a situation in which a position of an object sequentially changes (step S202). In a case where the assumed situation of the imaging range is the situation in which the position of the object sequentially changes (YES at step S202), the control device 11 selects the continuous AF mode as the mode that the imaging device 21 should use (step S203). In a case where the assumed situation of the imaging range is not the situation in which the position of the object sequentially changes (NO at step S202), the control device 11 selects the one-shot AF mode as the mode that the imaging device 21 should use (step S204). Then, the control device 11 allows the imaging device 21 to use the selected mode (step S205).

The situation in which the position of the object sequentially changes is a situation in which the object moves in a constant direction such as a situation in which the object is walking, for example.

An example of a specific process for achieving the above-described operation is hereinafter described.

As illustrated in FIG. 5, the control device 11 is provided with an input interface 110, a communication unit 111, a mode setting unit 112, and a mode storage unit 113.

Each component in the control device 11 may, in a case of generating or acquiring data, make the data available to other components. For example, each component may deliver the generated or acquired data to other components that use the data. Alternatively, each component may record the generated or acquired data in a storage area (memory and the like, not illustrated) in the control device 11. Each component of the control device 11 may receive the data to be used directly from the component that generates or acquires the data or may read the same from the above-described storage area when executing each process.

=Input Interface 110=

The input interface 110 is an interface for receiving an input of various commands from a user of the control device 11 to the control device 11. The input interface 110 is, for example, a touch panel, a touch pad, a keyboard, and/or a port for receiving signals from an input device (mouse, keyboard and the like).

=Communication Unit 111=

The communication unit 111 exchanges information with the imaging device 21.

One of pieces of information transmitted by the communication unit 111 is the setting instruction of the mode of the imaging device 21 (to be described later). The communication unit 111 may also transmit the imaging instruction to the imaging device 21. The imaging instruction may be generated, for example, on the basis of the command input from the input interface 110 by the user of the control device 11.

One of the pieces of information received by the communication unit 111 is the information regarding the situation of the imaging range of the imaging device 21 (specific example is to be described later).

The communication unit 111 may also communicate with other devices than the imaging device 21. For example, the communication unit 111 may receive information from the authentication device 31. For example, the control device 11 may receive the captured image from the imaging device 21 and transmit the captured image to the authentication device 31.

=Mode Setting Unit 112, Mode Storage Unit 113=

The mode setting unit 112 sets the AF mode of each of the imaging devices 21. Specifically, the mode setting unit 112 determines the type of the AF mode that the imaging device 21 should use for each of the imaging devices 21, and generates the setting instruction including the information specifying the determined type of the mode.

The mode setting unit 112 uses the information regarding the situation of the range captured by the imaging device 21 (hereinafter, the imaging range) when determining the type of the AF mode.

As an example, assume that the imaging control system 2 is adopted in a stadium where a competition is held. One of the imaging devices 21 may be installed at an entrance of the stadium. Another one of the imaging devices 21 may be installed in a spectator seat of the stadium.

In a case where the imaging device 21 is installed in the spectator seat, a target captured by the imaging device 21 is assumed to be a spectator sitting in the seat. The spectator sitting in the seat is supposed to be basically in the same position even though he/she moves a little. In this case, the one-shot AF mode is considered to be more preferable than the continuous AF mode as the AF mode used by the imaging device 21. Therefore, the mode setting unit 112 may be configured to determine the AF mode that the imaging device 21 should use to be the one-shot AF mode on the basis of information that the place where the imaging device 21 is installed is the spectator seat.

In a case where the imaging device 21 is installed at the entrance, the target to be captured by the imaging device 21 is assumed to walk in the vicinity of the entrance in a constant direction. In a case where the walking spectator is the target of imaging, the continuous AF mode is considered to be more preferable than the one-shot AF mode as the AF mode used by the imaging device 21. Therefore, the mode setting unit 112 may be configured to determine the AF mode that the imaging device 21 should use to be the continuous AF mode on the basis of information that the place where the imaging device 21 is installed is the entrance.

As described above, the mode setting unit 112 may use, for example, the information on the place where the imaging device 21 is installed (that is, the place captured by the imaging device 21) as the information regarding the situation of the range captured by the imaging device 21. On the basis of this information, the mode setting unit 112 may determine the type of the AF mode that the imaging device 21 should use.

The control device 11 may be configured to acquire the information on the place where the imaging device 21 is installed, for example, from the imaging device 21. The imaging device 21 has a function of specifying a position such as a global positioning system (GPS), and the imaging device 21 may transmit the information indicating the position specified by this function to the control device 11. Alternatively, identification information of a router used by the imaging device 21 for communication may be used as the information on the place where the imaging device 21 is installed.

Alternatively, the control device 11 may acquire the information on the place where the imaging device 21 is installed on the basis of information input from the user via the input interface 110. As an example, the control device 11 may present a screen to the user to select whether the place where the imaging device 21 is installed is the seat or the entrance, and receive a selection operation by the user via the input interface 110.

When determining the AF mode, the mode setting unit 112 refers to the mode storage unit 113.

The mode storage unit 113 stores, for example, data that associates the situation of the imaging range with the AF mode. The data may be in any format; for example, the data in a table format may be adopted.

Figures 7, 8:
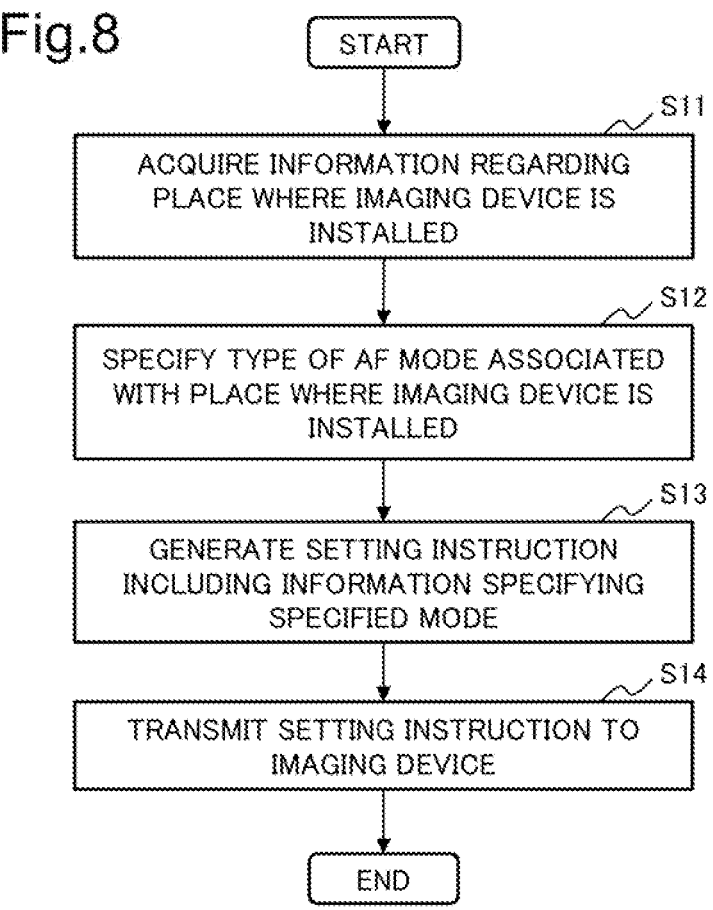
FIG. 7 is a view illustrating a first example of data used to determine a type of a focusing mode.
FIG. 8 is a flowchart illustrating an example of a processing flow of a control device according to the second example embodiment.

FIG. 7 is an example of a table stored by the mode storage unit 113 used in an application example described above.

With reference to this table, the mode setting unit 112 may extract the AF mode associated with the situation of the imaging range (for example, the fact that the place is the spectator seat) assumed from the information regarding the situation of the imaging range (for example, the information on the position of the imaging device 21) and may determine the extracted mode to be the mode that the imaging device 21 should use.

For specifying the assumed situation of the imaging range from the information regarding the situation of the imaging range, the mode setting unit 112 may separately refer to data that associates the information regarding the situation of the imaging range with the assumed situation of the imaging range. An example of such data is data that associates a range of a pair of latitude and longitude with the information indicating whether the place is the spectator seat or the entrance. In a case where the identification information of the router used for communication by the imaging device 21 is adopted as the information regarding the situation of the imaging range, one example of the above-described data is data that associates the identification information of the router with the information indicating whether the place is the spectator seat or the entrance.

The communication unit 111 may acquire, in addition to the information on the place where the imaging device 21 is installed, information on a posture (imaging direction, tilt and the like) of the imaging device 21. The mode setting unit 112 may specify the assumed situation of the imaging range on the basis of the place where the imaging device 21 is installed and the posture.

In this example embodiment, the "assumed situation of the imaging range" may be paraphrased as an "assumed situation as a situation around a person who should be included in the imaging range".

Another example of the information regarding the situation of the imaging range and another example of the assumed situation of the imaging range are to be described later.

<Operation>

[Operation of Control Device 11]

An example of a processing flow of the control device 11 is described with reference to a flowchart in FIG. 8. This example is an example in an aspect in which the place where the imaging device 21 is installed is used as the information regarding the situation of the imaging range.

The following description is the description of a flow of processing performed regarding one imaging device 21. In an example embodiment in which the control device 11 is connected to a plurality of imaging devices 21, the control device 11 may perform the following processing on each of the imaging devices 21.

First, the communication unit 111 acquires the information regarding the place where the imaging device 21 is installed (step S11). The communication unit 111 acquires the above-described information from the imaging device 21, for example.

The control device 11 may execute a process at step S11 on a predetermined cycle (for example, every second). The control device 11 may execute the process at step S11 as this receives the command from the user via the input interface 110.

Next, the mode setting unit 112 specifies the type of the AF mode associated with the place where the imaging device is installed (step S12). A process at step S12 may be executed each time the information is acquired by the process at step S11. Alternatively, the process at step S12 may be executed at predetermined frequency lower than the frequency at which the information is acquired by the process at step S11. The control device 11 may execute the process at step S12 as this receives the command from the user via the input interface 110.

Next, the mode setting unit 112 generates the setting instruction including the information specifying the specified mode (step S13).

The communication unit 111 then transmits the generated setting instruction to the imaging device 21 regarding the information acquired at step S1*l* (step S14).

[Operation of Imaging Device 21]

Figure 9:
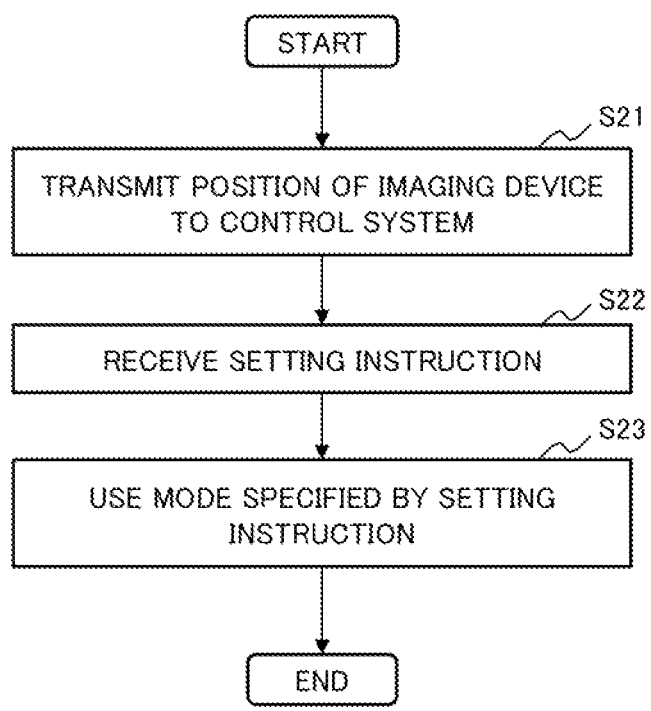
FIG. 9 is a flowchart illustrating an example of a processing flow of an imaging device according to the second example embodiment.

An example of a processing flow of the imaging device 21 is described with reference to a flowchart in FIG. 9.

The imaging device 21 transmits the position of the device itself (imaging device 21) to the control system 6 (step S21).

When receiving the setting instruction (step S22), the imaging device 21 uses the mode specified by the setting instruction (step S23). In other words, the imaging device 21 sets the AF mode used by the device itself (imaging device 21) to the mode instructed by the setting instruction. Specifically, in a case where the mode instructed by the setting instruction is different from the currently used mode, the imaging device 21 switches the currently used mode. In a case where the mode instructed by the setting instruction is the same as the currently used mode, the imaging device 21 does not switch the currently used mode.

The imaging device 21 may repeat the above-described processing on a predetermined cycle.

[Operation of Authentication Device 31 and Imaging Device 21]

Figure 10:
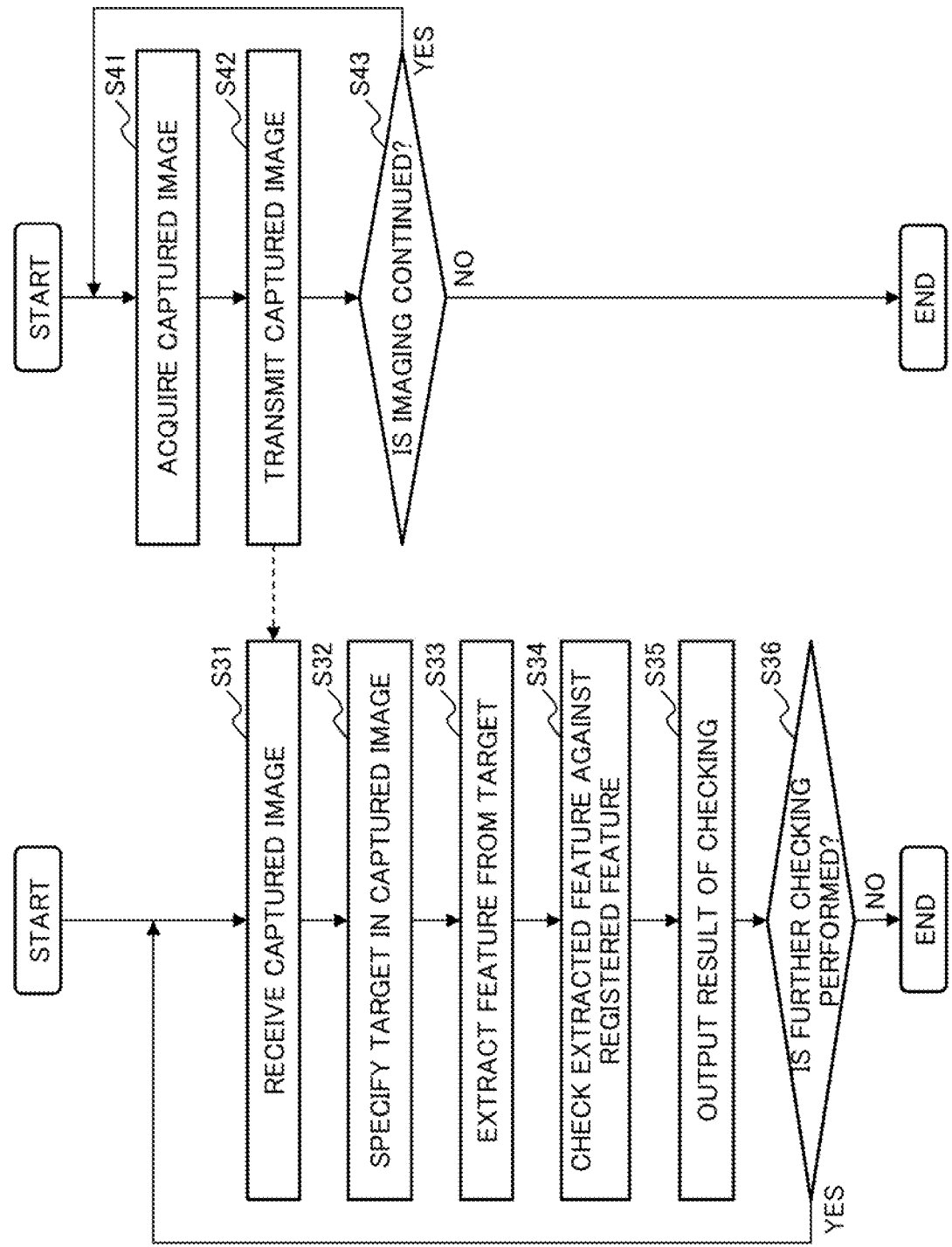
FIG. 10 is a flowchart illustrating a processing flow of an authentication device and the imaging device according to the second example embodiment.

An operation flow of the authentication device 31 and the imaging device 21 regarding the authentication processing by the authentication device 31 is described with reference to a flowchart in FIG. 10.

The imaging device 21 acquires the captured image by imaging (step S41) and transmits the captured image to the authentication device 31 (step S42).

The authentication device 31 starts the authentication processing when the communication unit 311 receives the captured image (step S31). First, the authentication execution unit 312 specifies the target (person who should be authenticated) captured in the captured image (step S32). The authentication execution unit 312 may specify all the persons captured in the received captured image as the targets, or may specify only the person captured in the captured image in a predetermined size as the target.

Each of the processes at steps S41, S42, S31, and S32 may be executed on a predetermined cycle, or may be executed upon reception of the command from the user via the input interface 110.

After the process at step S32, the authentication execution unit 312 extracts the feature from the specified target (step S33). The authentication execution unit 312 then checks the extracted feature against the registered features registered in the registration information database 313 (step S34).

Then, the output unit 314 outputs a result of the checking at step S34 (step S35). The result of the checking is, in other words, a result of the authentication. For example, the result of the checking is information indicating whether the target captured in the captured image is the person whose personal identification information is registered in the registration information database 313.

In a case of further performing the checking (that is, the authentication processing) (YES at step S36), the authentication device 31 performs the processing from step S31 again, and in a case where further checking is not performed (NO at step S36), this finishes the processing.

After the process at step S42, if the imaging is continued (YES at step S43), the imaging device 21 performs the processing from step S41 again, and if the imaging is not continued (NO at step S43), this finishes the processing.

Effect

According to the imaging control system 2 of the second example embodiment, the AF mode used by the imaging device 21 is appropriately set. The reason of this is similar to the reason described in the description of the first example embodiment.

In the description above, the example in which the mode setting unit 112 determines the type of the AF mode on the basis of the place where the imaging device 21 is installed is described. Since a place is closely associated with a behavior of a person, the AF mode may be appropriately set by using the information on the place. As a result, for example, the imaging device 21 may capture the seated person in the one-shot AF mode and capture the person moving in the constant direction in the continuous AF mode.

Since the authentication device 31 performs the authentication using the captured image generated by the imaging performed in the appropriately set mode, the authentication may be performed more quickly and more accurately.

The above-described effect is extremely excellent in a case where resolution significantly affects the speed and accuracy of the authentication. One of the cases where the resolution significantly affects the speed and accuracy of the authentication is a case where the iris is used in the authentication in a crowded place.

[Variation]

A variation of the second example embodiment is described as follows.

(1)

A control device 11 may store a mode currently used by an imaging device 21. Then, the control device 11 may transmit a setting instruction to the imaging device 21 only when a determined focusing mode is different from the currently executed mode. That is, the control device 11 compares the determined focusing mode with the mode currently used by the imaging device 21, and when this determines that both the modes are the same, this need not generate the setting instruction.

(2)

Figure 11:
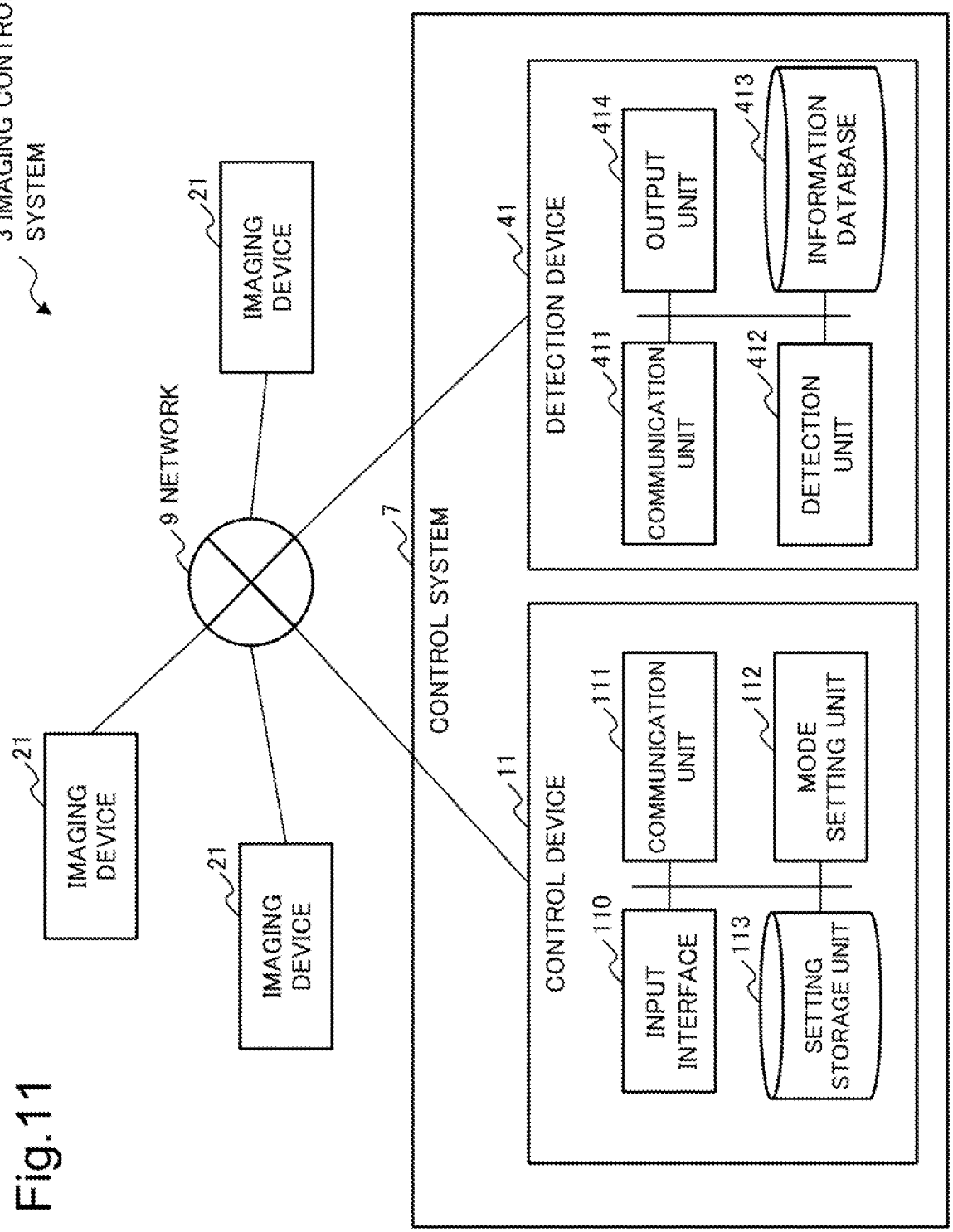
FIG. 11 is a block diagram illustrating a configuration of a variation of an imaging control system according to a second example embodiment.

In place of an authentication device 31, a detection device 41 may be applied. FIG. 11 is a block diagram illustrating a configuration of the variation in which the authentication device 31 of an imaging control system 2 is replaced with the detection device 41. In the description of this variation, it is described while replacing a reference numeral 2 of an imaging control system with a reference numeral 3, and replacing a reference numeral 6 of a control system with a reference numeral 7.

A function and an operation of the control device 11 and the imaging device 21 may be the same as those of the imaging control system 2.

The detection device 41 is a device that performs not authentication but detection of a detection target. The detection device 41 is provided with a communication unit 411, a detection unit 412, an information database 413, and an output unit 414.

The communication unit 411 receives a captured image from the imaging device 21.

The detection unit 412 executes detection processing of detecting a person satisfying a predetermined condition on persons included in the captured image. The predetermined condition is, for example, "having a body height shorter than 140 cm", "wearing sunglasses and a mask", "having suspicious behavior" and the like. The detection unit 412 performs the detection processing on the basis of an algorithm for determining the person satisfying the predetermined condition by using a feature extracted from a target. A known method (for example, a method of classifying on the basis of machine learning and the like) may be adopted as the above-described algorithm.

Information stored in the information database 413 is used in the detection processing. The information database 413 stores, for example, a value of a parameter in the algorithm used for detection.

An example of a specific process of the detection processing is hereinafter described.

First, the detection unit 412 detects the person from the captured image. A method of detecting the person may be a known method. The detection unit 412 then extracts a feature from the detected person. Taking a case where a body height is adopted as the feature as an example, the detection unit 412 estimates a distance from a top of head to a sole of foot of the detected person. The detection unit 412 determines whether the detected person satisfies the predetermined condition using the extracted feature and the information stored in the information database 413. When it is determined that the detected person satisfies the predetermined condition, the person is detected as satisfying the predetermined condition. In this case, the detection unit 412 outputs information indicating that the person satisfying the predetermined condition is detected.

In the imaging control system 3, a speed and accuracy of the detection processing performed by the detection device 41 are improved by the setting of the mode of the imaging device 21 by the control device 11.

(3)

An imaging range by the imaging device 21 does not need to be fixed at one place.

For example, the imaging device 21 may be configured to be able to change a posture (imaging direction, tilt and the like) so as to be able to image different areas. The imaging device 21 may change the posture periodically or on some occasion (for example, in response to an instruction from the control system 6) to image different areas.

As a result of the change of the posture of the imaging device 21, a place captured by the imaging device 21 changes, so that a preferred mode as the focusing mode used by the imaging device 21 might also change. Accordingly, it is also possible that the control device 11 receives information regarding the imaging range of the imaging device 21 upon change of the posture by the imaging device 21, and determines the mode that the imaging device 21 should use on the basis of the received information. In this case, the information regarding the imaging range is, for example, information indicating the position and posture of the imaging device 21.

The imaging device 21 may be provided on a moving body such as a drone or a person. In this case, the range captured by the imaging device 21 changes according to a position of the moving body provided with the imaging device 21. The imaging device 21 may be configured, for example, to specify the position of the imaging device 21 itself periodically or when the moving body moves, and to transmit information on the specified position to the control device 11. However, in a case where the control device 11 may grasp the position of the imaging device 21 by a method other than acquiring the information from the imaging device 21, the imaging device 21 need not be configured to specify the position.

One of methods of specifying the imaging range of the imaging device 21 by the control device 11 is a method of communicating with the moving body provided with the imaging device 21. The control device 11 may acquire the position (and/or posture) of the moving body from the moving body. Alternatively, in a mode in which the control device 11 indicates the position where the moving body should be, the position of the moving body may be analogized.

Another method of specifying the imaging range of the imaging device 21 by the control device 11 is a method of analyzing the captured image generated by the imaging device 21. The control device 11 may, for example, discriminate where the imaging device 21 captures an image on the basis of a feature (color, shape and the like) of an object (not limited to a person but may be a structure or installation) captured in the captured image.

The control device 11 may be configured to determine the mode that the imaging device 21 should use upon the change in position or imaging range of the imaging device 21.

(4)

There may be three or more types of AF modes. That is, the AF mode available to the imaging device 21 may include one or more modes different from a one-shot AF mode and a continuous AF mode. The mode setting unit 112 may determine the AF mode that the imaging device 21 should use according to an assumed situation among three or more types of modes.

(5)

A mode in which AF is not performed may be used in a certain situation. Examples of the mode in which AF is not performed include a fixed focus mode (mode in which the imaging is performed at a predetermined focal length) and a manual mode (mode in which manual focus adjustment is accepted).

Another Specific Example

A specific example of the information regarding the situation of the imaging range and a specific example of the assumed situation of the imaging range are hereinafter described.

The information regarding the situation of the imaging range is not limited to the information regarding the place where the imaging device 21 is installed. The information regarding the situation of the imaging range may be, for example, the following information.

<1> Information on Time (or Time of Day) of Imaging

Even if the imaging range is unchanged, there is a case where a type or a state of the person captured in the imaging range may change depending on time (or time of day). That is, since the time (or time of day) when the imaging is performed may also affect the situation of the imaging range, information on the time (or time of day) may be information used for determining the focusing mode.

FIG. 12 illustrates an example of a table in which the time of day and the focusing mode are associated with each other. This table is an example of a table for the mode setting unit 112 to determine the focusing mode in a case where the imaging device 21 is assumed to be installed at an entrance of a stadium where a competition is held. However, items in the rightmost column of the table illustrated in FIG. 12 are provided for facilitating understanding of the description and need not actually be stored.

On the basis of the table illustrated in FIG. 12, for example, when the current time (in a case where this may be considered to be the same as the time when the imaging is performed by the imaging device 21) is 9 AM, the mode setting unit 112 determines the focusing mode that the imaging device 21 should use to be the one-shot AF mode.

The table illustrated in FIG. 12 may be stored in the mode storage unit 113 on the basis of an input from the outside (via the input interface 110). For example, a management staff of the competition may prepare the table as illustrated in FIG. 12 and input via the input interface 110.

<2> Occurrence of Event Affecting State of Target

For example, the following events might affect the state of the object.

Opening (situation in which people move in a constant direction is assumed)

Generation of signal indicating that entrance is closed (situation in which movement of people is suppressed is assumed)

Generation of sign of competition start (situation in which people become more active is assumed)

Generation of announcement instructing people to move (situation in which people are encouraged to move is assumed)

Sound of chime or siren (for example, situation in which it is time for people to sit down is assumed)

Occurrence or elimination of traffic congestion (situation in which manner of people movement changes is assumed)

Therefore, information indicating that the above-described events (or any one of them) occur may be adopted as the information regarding the situation of the imaging range.

The communication unit 111 may be configured to receive a predetermined signal from a device that generates the predetermined signal in response to the occurrence of any of the above-described events. The control device 11 may receive the captured image from the imaging device 21 and detect the occurrence of the above-described event from the captured image.

<3> Result of Authentication

When the authentication gets difficult (in other words, the feature cannot be extracted sufficiently), it is highly likely that the situation of the imaging range has changed. Therefore, the result of the authentication may also be the information regarding the situation of the imaging range.

For example, the control device 11 may periodically acquire the result of the authentication processing by the authentication device 31 from the output unit 314. When the control device 11 determines that a ratio of the results indicating "authentication failure" out of the acquired results exceeds a predetermined threshold, this may determine a mode different from the mode used by the imaging device 21 as the mode that the imaging device 21 should use. In this case, the assumed situation of the imaging range is "a situation different from the situation in the past".

The mode setting unit 112 may determine the type of the mode that the imaging device 21 should use on the basis of a combination of the above-described specific examples (combination by AND condition, combination by OR condition and the like).

FIG. 13 is a view illustrating a further example of a table available to the mode setting unit 112. The table illustrated in FIG. 13 is a table for determining the type of the focusing mode on the basis of a combination of pieces of information on place and time. In a case of using the table illustrated in FIG. 13, for example, regarding the imaging device 21 in a parking, the mode setting unit 112 determines the focusing mode used by the imaging device 21 to be the one-shot AF mode when it is 8 AM in the parking.

<Hardware Configuration Implementing Each Part of Example Embodiment>

In each of the example embodiments described above, a block representing each component of each device is illustrated in a functional unit. However, the block representing the component does not necessarily mean that each component is formed of a separate module.

Processing of each component may also be implemented, for example, by a computer system reading and executing a program that causes the computer system to execute the processing stored in a computer-readable storage medium. The "computer-readable storage medium" is, for example, a portable medium such as an optical disk, a magnetic disk, a magneto-optical disk, and a nonvolatile semiconductor memory, and a storage device such as a read only memory (ROM) and a hard disk incorporated in the computer system. The "computer-readable storage medium" includes one that may temporarily hold a program such as a volatile memory in the computer system, and one that transmits the program such as a communication line such as a network or a telephone line. The program may be for achieving a part of the above-described functions, and further may achieve the above-described function by combination with the program already stored in the computer system.

Figure 14:
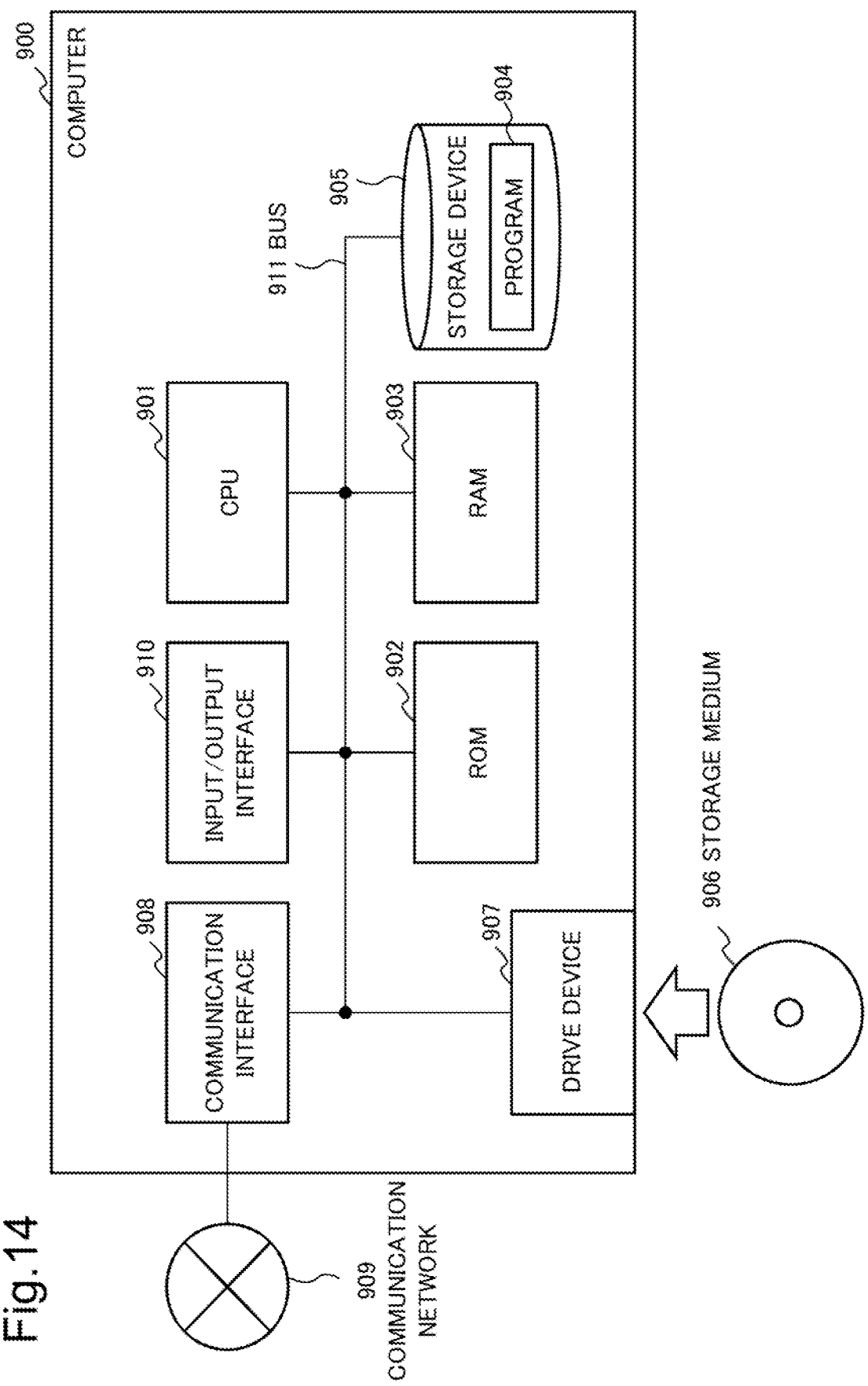
FIG. 14 is a block diagram illustrating an example of hardware forming each part of each example embodiment.

The "computer system" is, by way of example, a system including a computer 900 as illustrated in FIG. 14. The computer 900 includes the following configuration.

One or a plurality of central processing units (CPUs) 901
ROM 902
Random access memory (RAM) 903
Program 904 loaded into RAM 903
Storage device 905 that stores program 904
Drive device 907 that reads from and writes in storage medium 906
Communication interface 908 that connects to communication network 909
Input/output interface 910 that inputs/outputs data
Bus 911 that connects each component For example, each component of each device in each example embodiment is implemented by the CPU 901 loading a program 904A that implements a function of the component into the RAM 903 and executing the same. The program 904A that implements the function of each component of each device is stored in advance, for example, in the storage device 905 or the ROM 902. The CPU 901 then reads the program 904A as necessary. The storage device 905 is, for example, a hard disk. The program 904A may be supplied via the communication network 909 to the CPU 901, or may be stored in advance in the storage medium 906, read by the drive device 907, and supplied to the CPU 901. The storage medium 906 is, for example, a portable medium such as an optical disk, a magnetic disk, a magneto-optical disk, and a nonvolatile semiconductor memory.

There are various variations of a method of implementing each device. For example, each device may be implemented by a possible combination of a separate computer 900 and a program for each component. A plurality of components of each device may be implemented by a possible combination of one computer 900 and a program.

Some or all of the components of each device may be implemented by other general purpose or dedicated circuits, computers and the like, or a combination of them. They may be formed of a single chip or a plurality of chips connected via a bus.

In a case where some or all of the components of each device are implemented by a plurality of computers, circuits and the like, a plurality of computers, circuits and the like may be collectedly arranged or arranged in a distributed manner. For example, the computer, the circuit and the like may be implemented as a mode in which each of a client and server system, a cloud computing system and the like is connected via a communication network.

Some or all of the above-described example embodiments may be described as in the following supplementary notes, but are not limited to the following.

<<Supplementary Notes>>

[Supplementary Note 1]

An imaging control system provided with:

a control device provided with:

an acquisition means for acquiring information regarding a situation of a range captured by an imaging device;

a determination means for determining a mode according to an assumed situation of the range captured by the imaging device among a plurality of focusing modes; and a transmission means for transmitting designation information specifying the determined mode to the imaging device; and the imaging device that receives the designation information from the control device and captures an image using the mode specified by the received designation information.

[Supplementary Note 2]

The imaging control system according to supplementary note 1, in which the determination means determines, in a case where the assumed situation is a situation in which an object is assumed to move in a constant direction, a first mode of continuously executing autofocus as the mode used by the imaging device, and determines, in a case where the assumed situation is a situation in which the object is assumed to stay in a constant position, a second mode in which frequency of autofocus is lower than the frequency in the first mode as the mode used by the imaging device.

[Supplementary Note 3]

The imaging control system according to supplementary note 1 or 2, in which the determination means determines the mode used by the imaging device based at least on information on a place of the range captured by the imaging device.

[Supplementary Note 4]

The imaging control system according to any one of supplementary notes 1 to 3, in which the determination means determines the mode used by the imaging device based at least on information on time when the imaging device captures an image.

[Supplementary Note 5]

The imaging control system according to supplementary note 4, in which the control device is further provided with a storage means for storing a table for associating a pair of place and time with the mode, the acquisition means acquires the information on the place of the range captured by the imaging device and the information on the time when the imaging device captures an image, and the determination means specifies the mode associated with the pair of the place of the range captured by the imaging device and the time specified from the information acquired by the acquisition means, and determines the specified mode as the mode used by the imaging device in the table.

[Supplementary Note 6]

The imaging control system according to any one of supplementary notes 1 to 5, further provided with:

an authentication means for executing authentication processing of determining whether a person captured by the imaging device in the mode specified by the designation information is a person registered in a database.

[Supplementary Note 7]

The imaging control system according to any one of supplementary notes 1 to 6, further provided with:

a detection means for executing detection processing of determining whether the person captured by the imaging device in the mode specified by the designation information is a person satisfying a predetermined condition.

[Supplementary Note 8]

The imaging control system according to any one of supplementary notes 1 to 7, in which the imaging device is provided on a moving body, the imaging device or the moving body transmits information regarding a position of the imaging device to the control device, and the acquisition means acquires the transmitted information regarding the position as the information regarding the situation of the range captured by the imaging device.

[Supplementary Note 9]

An imaging control method provided with:

acquiring information regarding a situation of a range captured by an imaging device;

determining a mode according to an assumed situation of the range captured by the imaging device among a plurality of focusing modes; and transmitting designation information specifying the determined mode to the imaging device, in which the imaging device receives the designation information and captures an image using the mode specified by the received designation information.

[Supplementary Note 10]

The imaging control method according to supplementary note 9, provided with:

determining, in a case where the assumed situation is a situation in which an object is assumed to move in a constant direction, a first mode of continuously executing autofocus as the mode used by the imaging device, and determining, in a case where the assumed situation is a situation in which the object is assumed to stay in a constant position, a second mode in which frequency of autofocus is lower than the frequency in the first mode as the mode used by the imaging device.

[Supplementary Note 11]

The imaging control method according to supplementary notes 9 or 10, provided with:

determining the mode used by the imaging device based at least on information on a place of the range captured by the imaging device.

[Supplementary Note 12]

The imaging control method according to any one of supplementary notes 9 to 11, provided with:

determining the mode used by the imaging device based at least on information on time when the imaging device captures an image.

[Supplementary Note 13]

The imaging control method according to supplementary note 12, provided with:

storing a table for associating a pair of place and time with the mode;

acquiring the information on the place of the range captured by the imaging device and the information on the time when the imaging device captures an image; and specifying the mode associated with the pair of the place of the range captured by the imaging device and the time specified from the acquired information, and determining the specified mode as the mode used by the imaging device in the table.

[Supplementary Note 14]

The imaging control method according to any one of supplementary notes 9 to 13, provided with:

determining whether a person captured by the imaging device in the mode specified by the designation information is a person registered in a database.

[Supplementary Note 15]

The imaging control method according to any one of supplementary notes 9 to 14, provided with:

determining whether the person captured by the imaging device in the mode specified by the designation information is a person satisfying a predetermined condition.

[Supplementary Note 16]

The imaging control method according to any one of supplementary notes 9 to 15, in which the imaging device is provided on a moving body, and the imaging device or the moving body transmits information regarding a position of the imaging device, the imaging control method that acquires the transmitted information regarding the position as the information regarding the situation of the range captured by the imaging device.

[Supplementary Note 17]

A computer-readable storage medium recording a program that causes a computer to execute:

acquisition processing of acquiring information regarding a situation of a range captured by an imaging device;

determination processing of determining the mode used by the imaging device according to an assumed situation of the range captured by the imaging device among a plurality of focusing modes; and transmission processing of transmitting designation information specifying the determined mode to the imaging device.

[Supplementary Note 18]

The storage medium according to supplementary note 17, in which the determination processing determines, in a case where the assumed situation is a situation in which an object is assumed to move in a constant direction, a first mode of continuously executing autofocus as the mode used by the imaging device, and determines, in a case where the assumed situation is a situation in which the object is assumed to stay in a constant position, a second mode in which frequency of autofocus is lower than the frequency in the first mode as the mode used by the imaging device.

[Supplementary Note 19]

The storage medium according to supplementary notes 17 or 18, in which the determination processing determines the mode used by the imaging device based at least on information on a place of the range captured by the imaging device.

[Supplementary Note 20]

The storage medium according to any one of supplementary notes 17 to 19, in which the determination processing determines the mode used by the imaging device based at least on information on time when the imaging device captures an image.

[Supplementary Note 21]

The storage medium according to supplementary note 20, in which the program causes the computer to further execute storage processing of storing a table for associating a pair of place and time with the mode, the acquisition processing acquires the information on the place of the range captured by the imaging device and the information on the time when the imaging device captures an image, and the determination processing specifies the mode associated with the pair of the place of the range captured by the imaging device and the time specified from the information acquired by the acquisition processing, and determines the specified mode as the mode used by the imaging device in the table.

[Supplementary Note 22]

The storage medium according to any one of supplementary notes 17 to 21, in which the program causes the computer to further execute authentication processing of determining whether a person captured by the imaging device in the mode specified by the designation information is a person registered in a database.

[Supplementary Note 23]

The storage medium according to any one of supplementary notes 17 to 22, in which the program causes the computer to further execute detection processing of determining whether the person captured by the imaging device in the mode specified by the designation information is a person satisfying a predetermined condition.

[Supplementary Note 24]

The storage medium according to any one of supplementary notes 17 to 23, in which the imaging device is provided on a moving body, the imaging device or the moving body transmits information regarding a position of the imaging device, and the acquisition processing acquires the transmitted information regarding the position as the information regarding the situation of the range captured by the imaging device.

[Supplementary Note 25]

A control device provided with:

an acquisition means for acquiring information regarding a situation of a range captured by an imaging device;

a determination means for determining a mode used by the imaging device according to an assumed situation of the range captured by the imaging device among a plurality of focusing modes; and a transmission means for transmitting information specifying the determined mode to the imaging device.

[Supplementary Note 26]

A control method provided with:

acquiring information regarding a situation of a range captured by an imaging device;

determining a mode used by the imaging device according to an assumed situation of the range captured by the imaging device among a plurality of focusing modes; and transmitting information specifying the determined mode to the imaging device.

The disclosure is not limited to these example embodiments. It will be understood by those of ordinary skill in the art that various changes in form and details may be made therein without departing from the spirit and scope of the example embodiments as defined by the claims.

REFERENCE SIGNS LIST 1, 2, 3 Imaging control system
10 Control device
101 Acquisition unit
102 Determination unit
103 Transmission unit
11 Control device
110 Input interface
111 Communication unit
112 Mode setting unit
113 Mode storage unit
20, 21 Imaging device
31 Authentication device
311 Communication unit
312 Authentication execution unit
313 Registration information database
314 Output unit
41 Detection device
411 Communication unit
412 Detection unit
413 Information database
414 Output unit
900 Computer
901 CPU
902 ROM
903 RAM
904 Program
905 Storage device
906 Storage medium
907 Drive device
908 Communication interface
909 Communication network
910 Input/output interface
911 Bus

What is claimed is:

1. An imaging control system comprising:
a control device provided with:
a memory configured to store instructions;
a storage storing a table for associating a pair of place and time with the mode; and
at least one processor configured to execute the instructions to perform:
acquiring information regarding a situation of a range captured by an imaging device;
determining a mode according to an assumed situation of the range captured by the imaging device among a plurality of focusing modes; and
transmitting designation information specifying the determined mode to the imaging device;
wherein the imaging device receives the designation information from the control device and captures an image using the mode specified by the received designation information;
the at least one processor is further configured to execute the instructions to perform:
determining the mode used by the imaging device based at least on information on time when the imaging device captures an image;
acquiring the information on the place of the range captured by the imaging device and the information on the time when the imaging device captures an image; and
specifying the mode associated with the pair of the place of the range captured by the imaging device and the time specified from the information, and determining the specified mode as the mode used by the imaging device in the table.

2. The imaging control system according to claim 1, wherein
the at least one processor is configured to execute the instructions to perform:
determining, in a case where the assumed situation is a situation in which an object is assumed to move in a constant direction, a first mode of continuously executing autofocus as the mode used by the imaging device, and
determining, in a case where the assumed situation is a situation in which the object is assumed to stay in a constant position, a second mode in which frequency of autofocus is lower than the frequency in the first mode as the mode used by the imaging device.

3. The imaging control system according to claim 1, wherein
the at least one processor is configured to execute the instructions to perform:
determining the mode used by the imaging device based at least on information on a place of the range captured by the imaging device.

4. The imaging control system according to claim 1, wherein
the at least one processor is further configured to execute the instructions to perform:
determining whether a person captured by the imaging device in the mode specified by the designation information is a person registered in a database.

5. The imaging control system according to claim 1, wherein
the at least one processor is further configured to execute the instructions to perform:
determining whether the person captured by the imaging device in the mode specified by the designation information is a person satisfying a predetermined condition.

6. The imaging control system according to claim 1, wherein
the imaging device is provided on a moving body,
the imaging device or the moving body transmits information regarding a position of the imaging device to the control device, and
the at least one processor is configured to execute the instructions to perform:
acquiring the transmitted information regarding the position as the information regarding the situation of the range captured by the imaging device.

7. An imaging control method comprising:
acquiring information regarding a situation of a range captured by an imaging device;
determining a mode according to an assumed situation of the range captured by the imaging device among a plurality of focusing modes; and
transmitting designation information specifying the determined mode to the imaging device, wherein
the imaging device receives the designation information and captures an image using the mode specified by the received designation information;
the method further comprising:
determining the mode used by the imaging device based at least on information on time when the imaging device captures an image;
storing a table for associating a pair of place and time with the mode;

acquiring the information on the place of the range captured by the imaging device and the information on the time when the imaging device captures an image; and specifying the mode associated with the pair of the place of the range captured by the imaging device and the time specified from the acquired information, and determining the specified mode as the mode used by the imaging device in the table.

8. The imaging control method according to claim 7, comprising:

determining, in a case where the assumed situation is a situation in which an object is assumed to move in a constant direction, a first mode of continuously executing autofocus as the mode used by the imaging device, and determining, in a case where the assumed situation is a situation in which the object is assumed to stay in a constant position, a second mode in which frequency of autofocus is lower than the frequency in the first mode as the mode used by the imaging device.

9. The imaging control method according to claim 7, comprising:

determining the mode used by the imaging device based at least on information on a place of the range captured by the imaging device.

10. The imaging control method according to claim 7, comprising:

determining whether a person captured by the imaging device in the mode specified by the designation information is a person registered in a database.

11. The imaging control method according to claim 7, comprising:

determining whether the person captured by the imaging device in the mode specified by the designation information is a person satisfying a predetermined condition.

12. The imaging control method according to claim 7, wherein the imaging device is provided on a moving body, and the imaging device or the moving body transmits information regarding a position of the imaging device, the imaging control method that acquires the transmitted information regarding the position as the information regarding the situation of the range captured by the imaging device.

13. A non-transitory computer-readable storage medium recording a program that causes a computer to execute:

acquisition processing of acquiring information regarding a situation of a range captured by a imaging device;

determination processing of determining the mode used by the imaging device according to an assumed situation of the range captured by the imaging device among a plurality of focusing modes; and transmission processing of transmitting designation information specifying the determined mode to the imaging device;

determination processing of determining the mode used by the imaging device based at least on information on time when the imaging device captures an image;

storing processing of storing a table for associating a pair of place and time with the mode;

acquisition processing of acquiring the information on the place of the range captured by the imaging device and the information on the time when the imaging device captures an image; and specification processing of specifying the mode associated with the pair of the place of the range captured by the imaging device and the time specified from the acquired information, and determining the specified mode as the mode used by the imaging device in the table.

14. The storage medium according to claim 13, wherein the determination processing determines, in a case where the assumed situation is a situation in which an object is assumed to move in a constant direction, a first mode of continuously executing autofocus as the mode used by the imaging device, and determines, in a case where the assumed situation is a situation in which the object is assumed to stay in a constant position, a second mode in which frequency of autofocus is lower than the frequency in the first mode as the mode used by the imaging device.

15. The storage medium according to claim 13, wherein the determination processing determines the mode used by the imaging device based at least on information on a place of the range captured by the imaging device.

16. The storage medium according to claim 13, wherein the determination processing determines the mode used by the imaging device based at least on information on time when the imaging device captures an image.

* * * * *